(12) United States Patent
Richards et al.

(10) Patent No.: US 9,805,881 B2
(45) Date of Patent: Oct. 31, 2017

(54) MOTOR CONTROL CENTER UNIT DISCONNECT WITH INTERLOCKS

(71) Applicant: SCHNEIDER ELECTRIC USA, INC., Schaumburg, IL (US)

(72) Inventors: Walter J. Richards, Murfreesboro, TN (US); Gary M. Rosen, Lascassas, TN (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 15/023,837

(22) PCT Filed: Sep. 27, 2013

(86) PCT No.: PCT/US2013/062243
§ 371 (c)(1),
(2) Date: Mar. 22, 2016

(87) PCT Pub. No.: WO2015/047307
PCT Pub. Date: Apr. 2, 2015

(65) Prior Publication Data
US 2016/0233033 A1  Aug. 11, 2016

(51) Int. Cl.
*H01H 9/22* (2006.01)
*H02B 1/36* (2006.01)

(52) U.S. Cl.
CPC .............. *H01H 9/22* (2013.01); *H02B 1/36* (2013.01)

(58) Field of Classification Search
CPC .......................... H01H 9/20–9/26; H02B 1/36

USPC ....... 361/114, 115, 619, 624, 634, 652, 663, 361/673; 200/237, 329, 334
See application file for complete search history.

(56) References Cited

U.S. PATENT DOCUMENTS

| 3,142,003 A | 7/1964 | Olashaw |
| 3,626,253 A | 12/1971 | Sturdivan |
| 4,033,660 A | 7/1977 | Ericson et al. |

(Continued)

FOREIGN PATENT DOCUMENTS

| EP | 2110826 A1 | 10/2009 |
| WO | 2011000838 A1 | 1/2011 |

OTHER PUBLICATIONS

International Search Report and Written Opinion dated Feb. 27, 2014 in PCT/US13/62243, 18pp.

(Continued)

*Primary Examiner* — Anthony Haughton
*Assistant Examiner* — Yahya Ahmad
(74) *Attorney, Agent, or Firm* — Locke Lord LLP (57) ABSTRACT

A connect/disconnect mechanism for an MCC unit, prevents a circuit breaker from being turned on while the unit is being inserted into an MCC section, until stabs of the unit have been connected to a power bus. A cam is rotatably mounted on a pivoted platform in the MCC unit, an actuating arm is coupled between a unit on/off handle of the MCC unit and the cam, and a bail is pivotally mounted on the pivoting platform and connected to a switch handle of the breaker. A cam surface in a slot of the cam is configured to engage a pin projecting from the bail, when the pivoted platform is forced in a backward direction to connect the stabs to the bus, thereby operatively connecting the unit on/off handle to the switch handle of the breaker.

6 Claims, 6 Drawing Sheets

(56) References Cited

U.S. PATENT DOCUMENTS

| | | | | |
|---|---|---|---|---|
| 4,139,748 A | * | 2/1979 | Wolfe | H02B 11/00 200/50.26 |
| 4,214,291 A | | 7/1980 | Koshman et al. | |
| 4,536,822 A | | 8/1985 | Osborne | |
| 4,768,967 A | | 9/1988 | Fritsch | |
| 4,789,919 A | * | 12/1988 | Cox | H02B 11/133 200/50.07 |
| 5,486,663 A | * | 1/1996 | Fritsch | H01H 9/22 200/50.21 |
| 5,510,960 A | | 4/1996 | Rosen | |
| 6,337,449 B1 | * | 1/2002 | Brouillat | H01H 77/104 200/400 |
| 6,472,971 B2 | * | 10/2002 | Toyama | H01H 71/52 200/401 |
| 6,486,421 B1 | * | 11/2002 | Jones | H01H 9/26 200/50.32 |
| 6,954,060 B1 | | 10/2005 | Edel | |
| 7,057,898 B2 | | 6/2006 | Chen et al. | |
| 7,688,572 B2 | | 3/2010 | Yee et al. | |
| 7,795,551 B2 | | 9/2010 | Narayanan et al. | |
| 8,199,022 B2 | | 6/2012 | Morris et al. | |
| 8,331,081 B2 | | 12/2012 | Abrahamsen et al. | |
| 8,333,600 B2 | | 12/2012 | Yanniello | |
| 8,414,051 B2 | | 4/2013 | Nakayoshi | |
| 8,476,992 B2 | | 7/2013 | Yang et al. | |
| 9,123,488 B2 | | 9/2015 | Seo | |
| 2007/0111575 A1 | | 5/2007 | Jensen et al. | |
| 2008/0079436 A1 | | 4/2008 | Gollhardt et al. | |
| 2008/0258667 A1 | | 10/2008 | Morris et al. | |
| 2010/0084920 A1 | | 4/2010 | Banting et al. | |
| 2010/0118473 A1 | | 5/2010 | Morris et al. | |
| 2010/0280775 A1 | | 11/2010 | Schafer et al. | |
| 2011/0110049 A1 | * | 5/2011 | Lehtola | H05K 7/1409 361/724 |
| 2011/0149480 A1 | | 6/2011 | Leeman et al. | |
| 2011/0252845 A1 | | 10/2011 | Webb et al. | |
| 2011/0285483 A1 | | 11/2011 | Morris et al. | |
| 2011/0299228 A1 | | 12/2011 | Milovac et al. | |
| 2012/0039061 A1 | | 2/2012 | McBee et al. | |
| 2012/0064746 A1 | | 3/2012 | Bellows et al. | |
| 2012/0127636 A1 | | 5/2012 | Abrahamsen et al. | |
| 2012/0228097 A1 | | 9/2012 | Gemme et al. | |
| 2013/0088812 A1 | | 4/2013 | Yee et al. | |
| 2015/0171605 A1 | * | 6/2015 | Jo | H01H 9/20 361/609 |
| 2016/0036204 A1 | | 2/2016 | Schroeder | |
| 2016/0248232 A1 | | 8/2016 | Richards et al. | |

OTHER PUBLICATIONS

"Model 6 Export Motor Control Centers," Instruction Bulletin 80446-300-01A, Square D. Company, Oct. 2001, 66 pp.

"Model 6 Motor Control Center with Altivar AC Drives", Square D. Brochure, Sep. 2012, 2pp.

* cited by examiner

MOTOR CONTROL CENTER UNIT DISCONNECT WITH INTERLOCKS

FIELD OF THE INVENTION

The invention is generally directed to a disconnect mechanism for a motor control center unit.

BACKGROUND OF THE INVENTION

A motor control center, also referred to as an MCC, is generally a cabinet-like structure that is divided into modular sections designed to accept a plurality of component motor control center units, also referred to as MCC units. An MCC unit is generally a drawer-like container of electrical components, such as circuit breakers, motor starters, relays, power meters, programmable logic controllers, and other control circuit components used for electrical power distribution in industrial and commercial applications. The MCC unit slides into an MCC section and plugs into a common power bus running vertically along the back side of the MCC section. The MCC unit includes a connector, also referred to as a stab assembly or stabs, arranged on the back side of the unit, to plug into the power bus. When an MCC unit is installed, serviced, or removed from an MCC section, it is of utmost importance to prevent the operator from being exposed to electrical hazards. In existing MCC units, an operator accessible unit on/off handle on the front of the MCC unit enables a circuit breaker within the unit to be switched off before the MCC unit is installed in or removed from the MCC section.

Unit interlock mechanisms have been provided in the past to prevent inserting or removing MCC units from an MCC section, without first actuating an advance/retract handle located on the front of the MCC unit, to retract the stabs of the unit to prevent contact with the power bus. The unit interlock blocks inserting the MCC unit into the motor control center section, without first actuating the advance/retract handle for the advance/retract mechanism to retract the stabs to prevent contact with a power bus. To insert the MCC unit into the MCC section, the operator slides the MCC unit into an available opening in the section, so that the back wall of the MCC unit is close to the common power bus running along the back side of the section. The operator then actuates the advance/retract handle for the advance/retract mechanism to connect the stabs of the MCC unit to the power bus.

Many MCC units include circuit breakers connected to the stabs that may be any form of connector of the circuit breaker to the power bus. One example of an existing MCC unit mounts the circuit breaker and the stabs on a pivoted platform, also referred to as the unit line power jaws. The pivoted platform is connected to the advance/retract mechanism that is operated by the advance/retract handle. Operating the advance/retract handle forces the platform to pivot and either advance the stabs to contact the power bus or retract the stabs to disconnect them from the power bus. The existing unit interlock in an MCC unit, blocks the unit from being inserted into the MCC section when the stabs are advanced, to avoid any connection to the power bus during insertion of the unit. After the MCC unit has been inserted into the MCC section, the unit interlock blocks the unit from being removed from the MCC section after stabs have been advanced and connected to the power bus. The advance/retract mechanism must retract the stabs before the unit interlock allows the unit to be removed from the section.

SUMMARY OF THE INVENTION

To further increase operator safety, a connect/disconnect mechanism in the MCC unit, operates after the unit has been inserted into the MCC section, to prevent the circuit breaker from being turned on by the unit on/off handle located on the front of the unit, until after the advance/retract mechanism has advanced the stabs to connect them to the power bus. After the MCC unit has been inserted into the MCC section and after the advance/retract mechanism has advanced the stabs to connect them to the power bus, the connect/disconnect mechanism allows the unit on/off handle to toggle the circuit breaker on and off.

When the advance/retract mechanism retracts the stabs from connection to the power bus, the connect/disconnect mechanism operates to disengage the circuit breaker handle from the unit on/off handle on the front of the MCC unit. Because the connect/disconnect mechanism has disengaged the circuit breaker handle from the unit on/off handle on the front of the unit, the circuit breaker cannot be turned back on.

The connect/disconnect mechanism includes a bail and pin interlock mounted on the pivoting platform, coupled between the unit on/off handle on the front of the MCC unit and the switch handle of the circuit breaker in the MCC unit. The bail and pin interlock disconnects the circuit breaker switch handle from the unit on/off handle on the front of the MCC unit, when the stabs on the pivoted platform are disconnected from the power bus.

The connect/disconnect mechanism in the MCC unit, operates after the unit has been inserted into the MCC section, to prevent the circuit breaker from being turned on by the unit on/off handle on the front of the unit, until after the advance/retract mechanism has advanced the stabs to connect them to the power bus. After the MCC unit has been inserted into the section and after the advance/retract mechanism has advanced the stabs to connect them to the power bus, the connect/disconnect mechanism allows the unit on/off handle to toggle the circuit breaker on and off. The bail and pin interlock mounted on the pivoting platform is brought into engagement with the unit on/off handle on the front of the MCC unit, as the pivoting platform is moved backwards by the advance/retract mechanism. The operator may now actuate the unit on/off handle on the front of the MCC unit to turn the circuit breaker on. In this manner, the circuit breaker cannot be turned on until the stabs on the pivoting platform are connected to the power bus.

To remove the MCC unit from the MCC section, the advance/retract mechanism may be actuated to separate the bus stabs of the MCC unit from the power bus of the MCC section. Operating the advance/retract mechanism forces the platform to pivot in the forward direction and the bail and pin interlock disconnects the circuit breaker switch handle from the unit on/off handle on the front of the MCC unit. Because the bail and pin interlock has disengaged the circuit breaker handle from the unit on/off handle on the front of the unit, the circuit breaker cannot be turned back on. The MCC unit may then be safely removed from the section without exposing the operator to electrical hazards.

BRIEF DESCRIPTION OF THE DRAWINGS

Example embodiments of the invention are depicted in the accompanying drawings that are briefly described as follows:

FIG. 1Ca shows a detail of the relative position of the switch handle on the circuit breaker and the bail in FIG. 1C. FIG. 1Cb shows a detail of the relative position of the stabs and the power bus in FIG. 1C.

DETAILED DESCRIPTION OF THE EXAMPLE EMBODIMENTS

Figure 1:
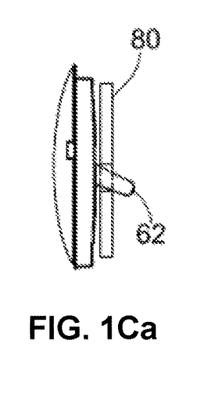
Figure 1A:
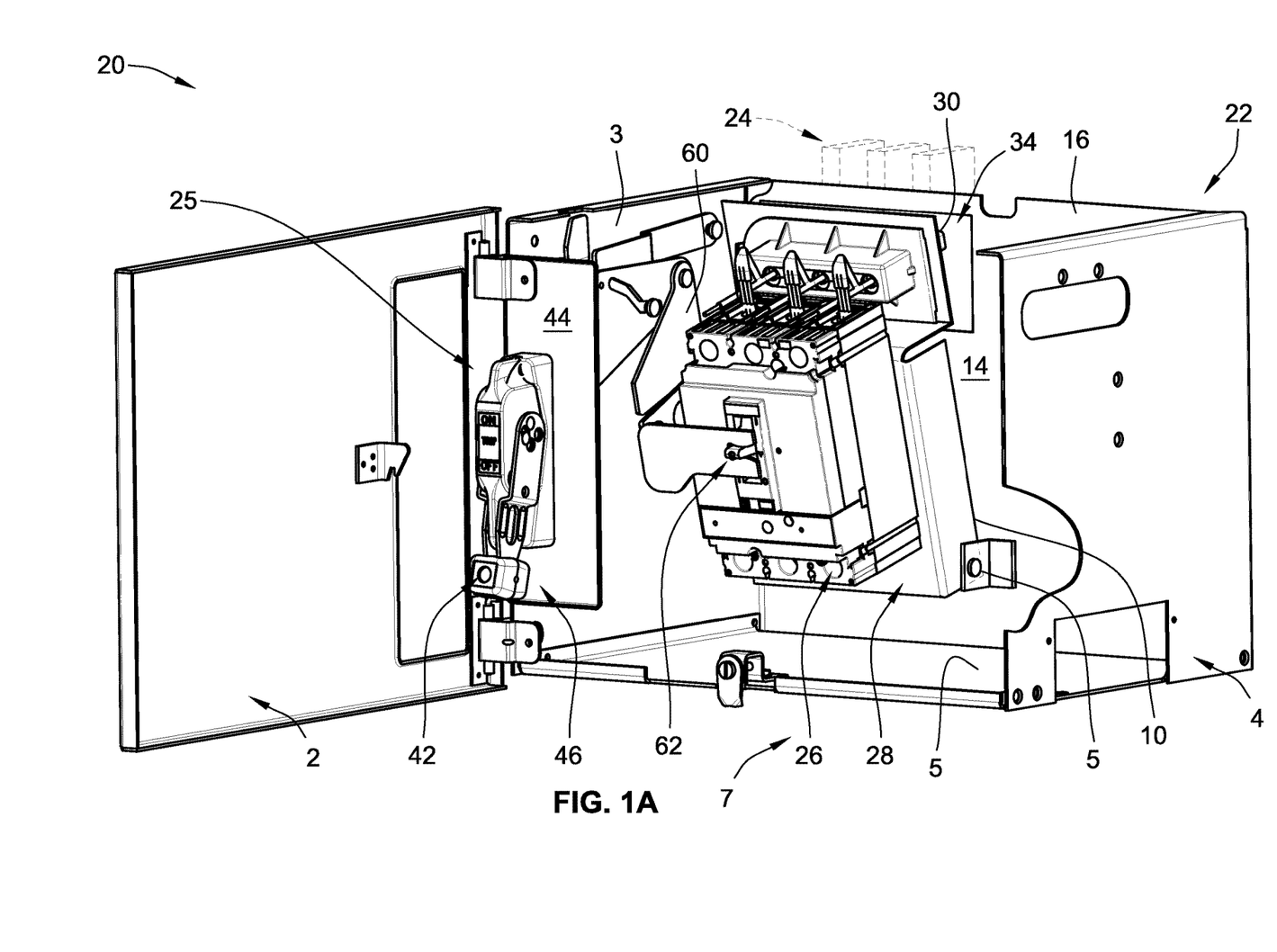
FIG. 1A is a perspective view from the top right side, of an example embodiment of the invention in an MCC unit, with the top plate of the unit being removed for clarity, illustrating the bus stabs are totally disconnected from the power bus, the unit on/off handle is fully "Off" (down), and the circuit breaker is off.

FIG. 1A is a perspective view from the top right side of an example embodiment of the invention in a motor control center (MCC) unit 20. The figure shows the housing of MCC unit configured to be inserted into an MCC section (not shown), with the top plate of the housing being removed for clarity. The front door 2, right wall 3, left wall 4, bottom plate 5, and back wall 16, along with the removed top plate, form the outer structure of the housing for the MCC unit 20. The front door 2 is hinged to the right wall 3 and configured to open the front side 7 of the housing to provide access to the interior space of the MCC unit 20. Within the interior of the MCC unit 20, the platform 10 is pivotally mounted on the pivot 12 fastened to the interior face 14 of the back wall 16 of the MCC unit 20. The exterior face 22 of the back wall 16 is configured to be located adjacent to the electrical power bus 24 when the MCC unit 20 has been inserted into the MCC. The platform 10 supports the circuit breaker 26 on the front side thereof and the stabs 30 on the back side thereof The stabs 30 are insulatively mounted on the platform 10 and electrically connected to the electrical switch in the circuit breaker 26. Operating the switch handle 62 on the circuit breaker 26, turns the circuit breaker on or off. The bus stabs 30 on the backside of the platform 10 project through an opening 34 in the back wall 16 of the MCC unit 20, to mechanically and electrically engage the electrical power bus 24 for electrical connection therewith, when the platform 10 is pushed in the backward direction on the pivot 12, against the back wall 16. By operating an advance/retract handle 90 (shown in FIGS. 1C, 2, and 3) accessible on the front of the MCC unit, an advance/retract mechanism 92 (shown in FIGS. 1C, 2, and 3) pushes the pivoted platform 10 to connect the stabs 30 of the MCC unit 20 to the power bus 24.

FIG. 1A illustrates the connect/disconnect mechanism 25 for the MCC unit 20. The connect/disconnect mechanism 25 in the MCC unit 20, operates after the unit has been inserted into the MCC section, to prevent the circuit breaker 26 from being turned on by the unit on/off handle 42 located on the front of the unit, until after the advance/retract mechanism 92 has advanced the stabs 30 to connect them to the power bus 24. After the MCC unit 20 has been inserted into the MCC section and after the advance/retract mechanism 92 has advanced the stabs 30 to connect them to the power bus 24, the connect/disconnect mechanism 25 allows the unit on/off handle 42 to toggle the circuit breaker switch handle 62 on and off.

Figure 1B:
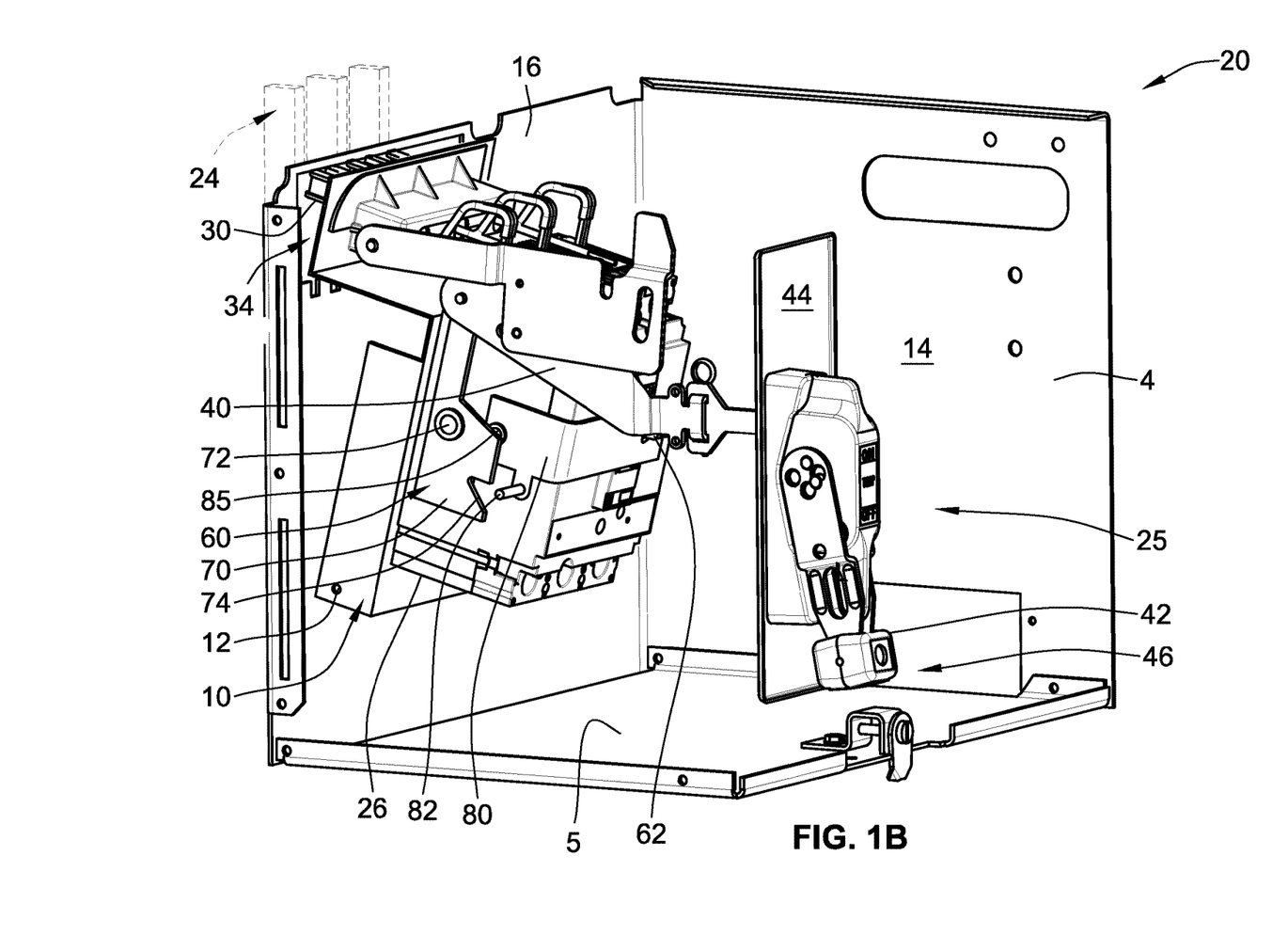
FIG. 1B is a perspective view from the upper left side, of the example embodiment of the invention in the MCC unit of FIG. 1A, with the front door, right wall, top plate, and bottom plate of the MCC unit being removed for clarity, illustrating the bus stabs are totally disconnected from the power bus, the unit on/off handle is fully "Off" (down), and the circuit breaker is off.

FIG. 1A illustrates the stabs 30 being totally disconnected from the power bus 24, the unit on/off handle 42 being fully "Off" (down) in the off position 46, and the circuit breaker 26 being off. FIG. 1B is a perspective view from the upper left side, of the example embodiment of the invention of FIG. 1A, with the front door 2, right wall 3, bottom plate 5, and top plate of the MCC unit being removed for clarity.

To insert the MCC unit 20 into the MCC section, the operator slides the MCC unit 20 into an available opening in the section, so that the back wall 16 of the MCC unit 20 is adjacent to the common power bus 24 running vertically along the back side of the section. The operator then actuates the advance/retract handle 90 for the advance/retract mechanism 92 (shown in FIGS. 1C, 2, and 3) to cause the advance/retract mechanism 92 to push the pivoted platform 10 backward to connect the stabs 30 of the MCC unit 20 to the power bus 24. Operating the advance/retract handle 90 for the advance/retract mechanism 92 forces the platform 10 to pivot in the backward direction on the pivot 12, and connect the stabs 30 to the bus 24.

Figure 1C:
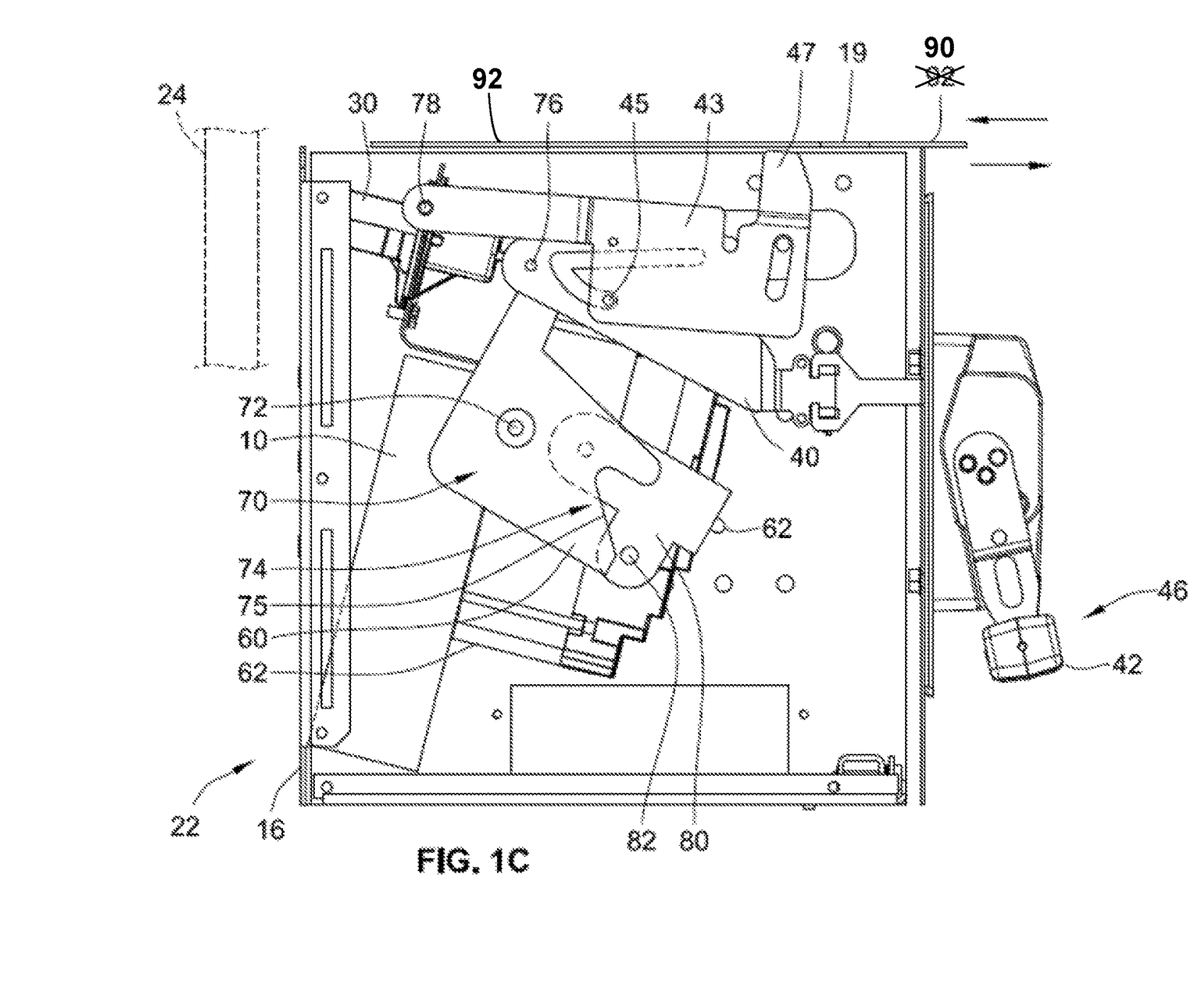
FIG. 1C is a side view from the left side, of the example embodiment of the invention in the MCC unit of FIG. 1A, with the right wall being removed for clarity, illustrating the bus stabs are totally disconnected from the power bus, the unit on/off handle is fully "Off" (down), and the circuit breaker is off.

FIG. 1C is a side view from the left side, of the example embodiment of the invention in the MCC unit of FIGS. 1A and 1B, with the right wall 3 being removed for clarity. The figure illustrates the stabs 30 being totally disconnected from the power bus 24, the unit on/off handle being fully "Off" (down), and the circuit breaker being off. The connect/disconnect mechanism 25 includes the bail and pin interlock 60 mounted on the pivoting platform 10, coupled between the unit on/off handle 42 on the front of the MCC unit 20 and the switch handle 62 of the circuit breaker 26 in the MCC unit. The bail and pin interlock 60 includes the actuating arm 40, the cam 70, the bail 80, and the pin 82. The actuating arm 40 is connected to the unit on/off handle 42 located on the front wall 44 of the MCC unit 20. The cam 70 is rotatably mounted on the cam shaft 72 mounted on the pivoted platform 10. The cam 70 has a cam surface 75 in the slot 74 opening on the periphery of the cam 70. FIG. 1Ca shows a detail of the relative position of the switch handle 62 on the circuit breaker and the bail 80 in FIG. 1C. FIG. 1Cb shows a detail of the relative position of the stabs 30 and the power bus 24 in FIG. 1C.

Figures 2, 2A, 2B:
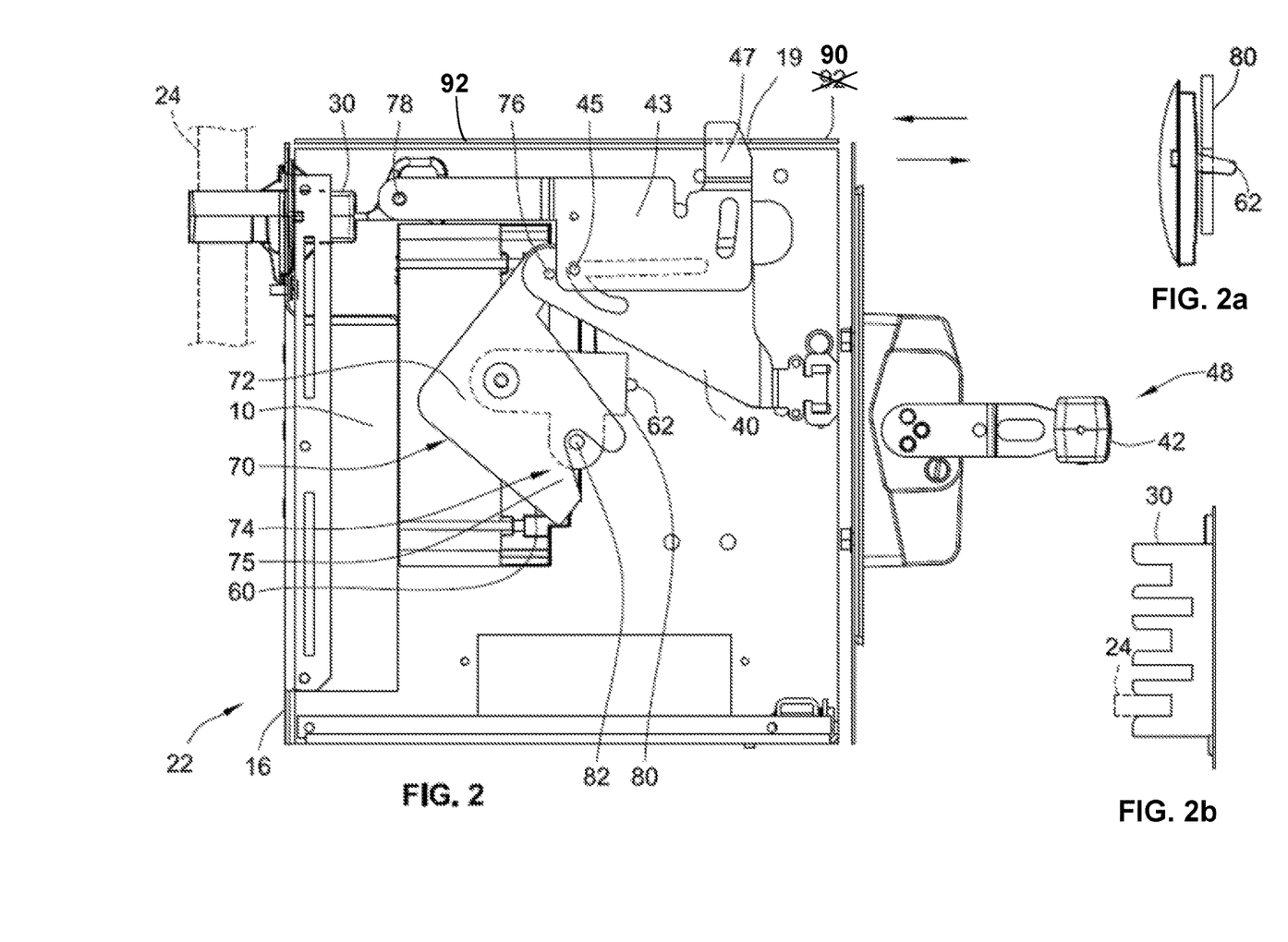
FIG. 2 is a side view from the left side, of the example embodiment of the invention in the MCC unit of FIG. 1A, with the right wall being removed for clarity, illustrating that the stabs are contacting the power bus, but the unit on/off handle is in an intermediate position so that the connect/disconnect mechanism has not yet fully connected the circuit breaker switch to the unit on/off handle.
FIG. 2a shows a detail of the relative position of the switch handle on the circuit breaker and the bail in FIG. 2.
FIG. 2b shows a detail of the relative position of the stabs and the power bus in FIG. 2.

FIG. 2 is a side view from the left side, of the example embodiment of the invention in the MCC unit 20 of FIG. 1B, with the right wall 3 being removed for clarity. The figure illustrates the stabs 30 contacting the power bus 24, but the unit on/off handle 42 is in an intermediate position 48 so that the connect/disconnect mechanism 25 has not yet fully connected the circuit breaker switch handle 62 to the unit on/off handle 42. FIG. 2a shows a detail of the relative position of the switch handle 62 on the circuit breaker and the bail 80 in FIG. 2. FIG. 2b shows a detail of the relative position of the stabs 30 and the power bus 24 in FIG. 2.

Figures 3, 3A, 3B:
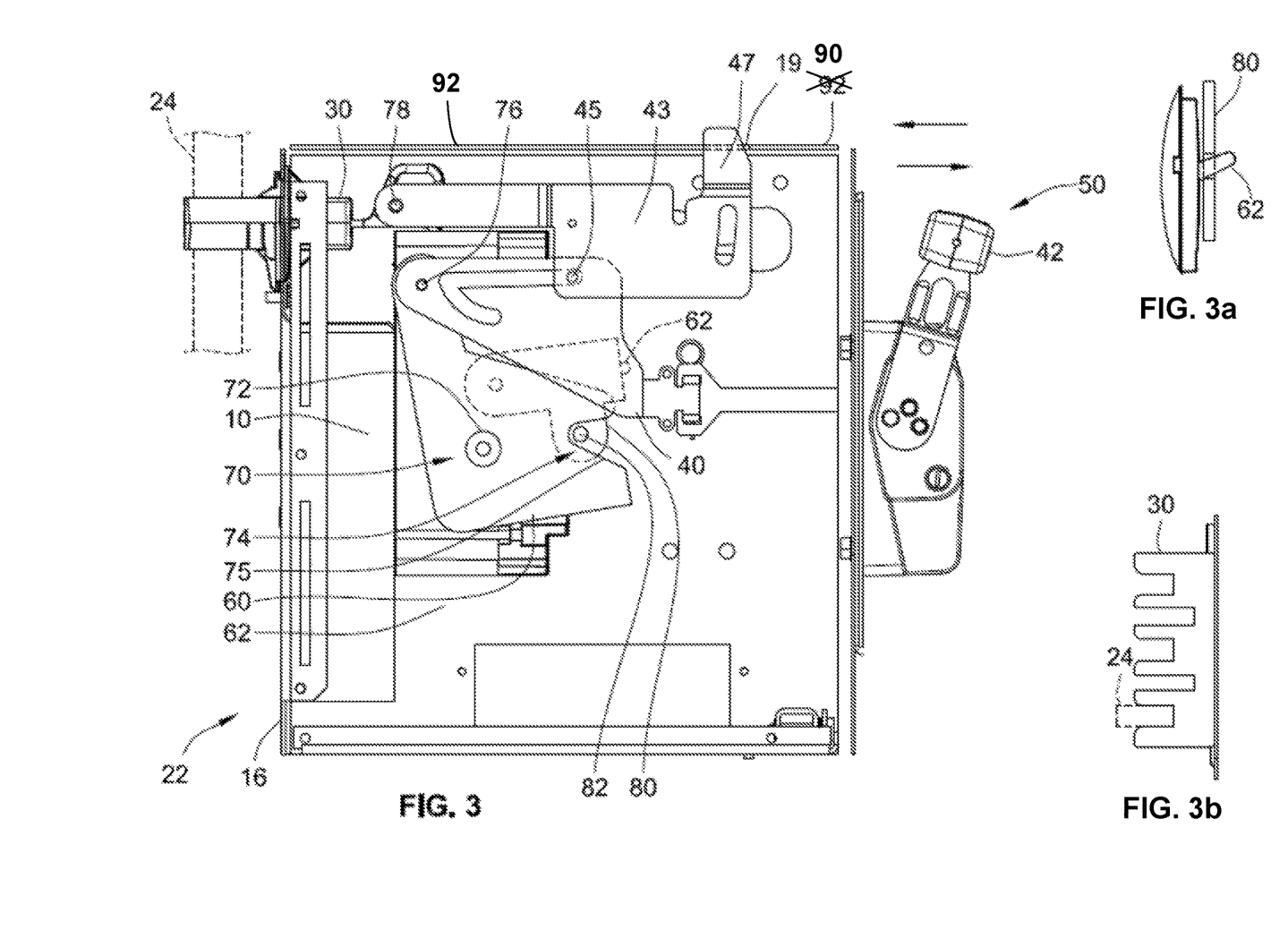
FIG. 3 is a side view from the left side, of the example embodiment of the invention in the MCC unit of FIG. 1A, with the right wall being removed for clarity, illustrating the stabs are contacting the power bus, the unit on/off handle is fully "On" (all the way up), so that the connect/disconnect mechanism has fully connected the circuit breaker switch to the unit on/off handle.
FIG. 3a shows a detail of the relative position of the switch handle on the circuit breaker and the bail in FIG. 3.
FIG. 3b shows a detail of the relative position of the stabs and the power bus in FIG. 3.

FIG. 3 is a side view from the left side, of the example embodiment of the invention in the MCC unit 20 of FIG. 1B, with the right wall 3 being removed for clarity. The figure illustrates the stabs contacting the power bus 24 and the unit on/off handle 42 being fully "On" (all the way up), so that the connect/disconnect mechanism 25 has fully connected the circuit breaker switch handle 62 to the unit on/off handle 42. FIG. 3a shows a detail of the relative position of the switch handle 62 on the circuit breaker and the bail 80 in FIG. 3. FIG. 3b shows a detail of the relative position of the stabs 30 and the power bus 24 in FIG. 3.

The actuating arm 40 is configured to rotate the cam 70 in response to actuation of the unit on/off handle 42, rotating it counter-clockwise when unit on/off handle 42 is moved to the on position 50 of FIG. 3, and rotating it clockwise when unit on/off handle 42 moved through the intermediate position 48 of FIG. 2, to the off position 46 in FIG. 1C. The actuating arm 40 is further configured to cause the cam 70 to rotate as the cam shaft 72, on which the cam 70 is rotatably mounted, follows the pivoting motion of the pivoted platform 10 relative to a fixed position of the actuating arm 40. When the pivoting platform 10 moves in the forward direction from its position in FIG. 2, to disconnect the stabs 30 from the bus 24, as shown in FIG. 1C, the cam 70 rotates counter-clockwise with respect to the platform 10. When the pivoting platform 10 moves in the backward direction from the position shown in FIG. 1C, to connect the stabs 30 to the bus 24, as shown in FIG. 2, the cam 70 rotates clockwise with respect to the platform 10.

The bail 80 is pivotally mounted on bail pivot 85 on the pivoting platform 10, shown in FIG. 1B. The bail 80 is connected to the switch handle 62 of the circuit breaker 26 so that an upward movement of the bail 80 turns the circuit breaker 26 ON and a downward movement of the bail 80 turns the circuit breaker 26 OFF. The bail 80 has a pin 82 projecting therefrom, which engages the cam slot 74 in the cam 70.

The cam surface 75 in the slot 74 of the cam 70 is configured to engage the pin 82 projecting from the bail 80 in a first position when the pivoted platform 10 supporting the stabs 30 is forced in the backward direction from the position shown in FIG. 1C, to connect the stabs 30 to the bus 24 as shown in FIG. 2. When the pivoting platform 10 moves in the backward direction to connect the stabs 30 to the bus 24, the cam 70 rotates clockwise with respect to the platform 10 to engage the pin 82, as shown in FIG. 2. In this manner, the unit on/off handle 42 on a front wall 44 of the MCC unit 20 is operatively connected to the switch handle 62 of the circuit breaker 26, so that the operator may actuate the unit on/off handle 42 and turn on or off the circuit breaker 26. The unit on/off handle 42 is shown in the intermediate position 48 in FIG. 2.

When unit on/off handle 42 is moved upward through the intermediate position 48 in FIG. 2 to the on position 50 in FIG. 3, the actuating arm 40 is configured to rotate the cam 70 in the counter-clockwise direction, pushing the engaged pin 82 upward, thereby turning ON the circuit breaker 26, as shown in FIG. 3. When unit on/off handle 42 is moved from the on position 50 in FIG. 3, through the intermediate position 48 of FIG. 2, downward to the off position 46 of FIG. 1C, the actuating arm 40 is configured to rotate the cam 70 in the clockwise direction, pushing the engaged pin 82 downward, thereby turning OFF the circuit breaker 26.

After the stabs 30 have been connected to the bus 24 as shown in FIG. 2, the operator may actuate the unit on/off handle 42 on the front of the MCC unit 20 to turn the circuit breaker ON. The unit on/off handle 42 is shown in the on position 50 in FIG. 3. In this manner, the circuit breaker 26 cannot be turned on until the stabs 30 on the pivoted platform 10 are connected to the power bus 24. The MCC unit 20 may thus be safely inserted into the MCC section without exposing the operator to an electrical hazard.

Figure 4:
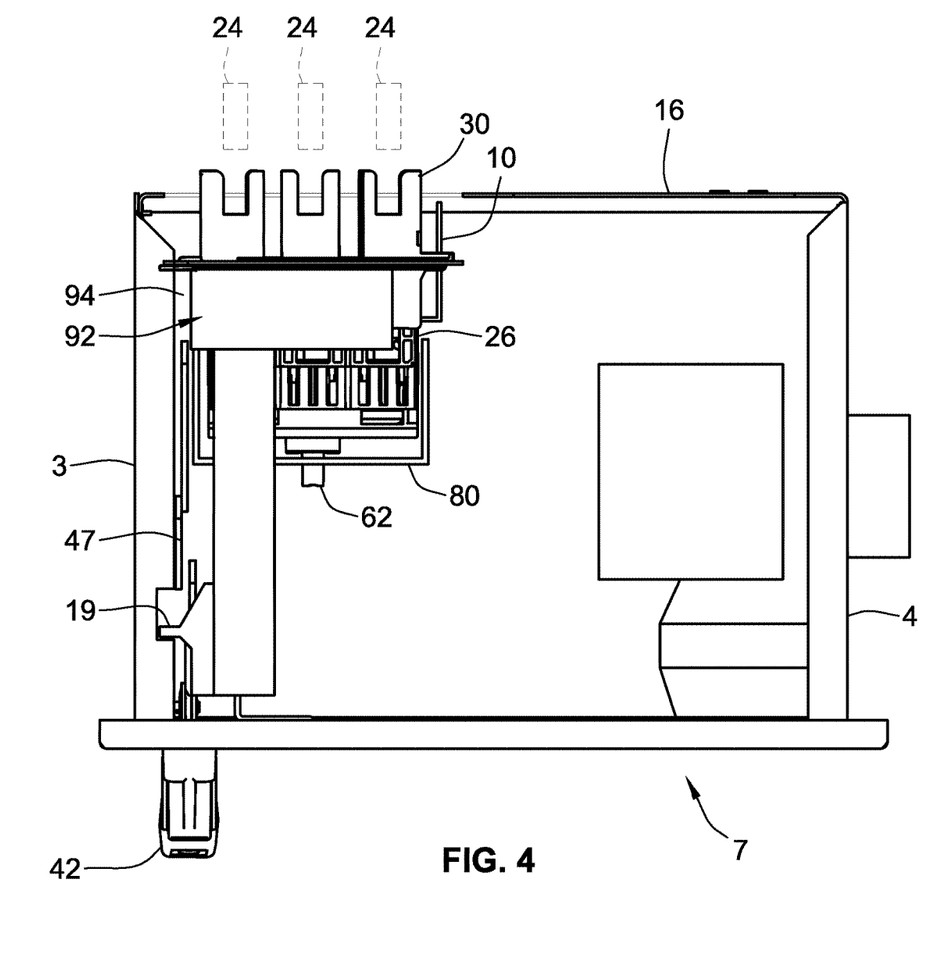
FIG. 4 is a top view of an example embodiment of the invention in the MCC unit of FIG. 1A, with the top plate being removed for clarity, illustrating the advance/retract handle and advance/retract mechanism for connecting or disconnecting the stabs with the power bus.

To remove the MCC unit 20 from the MCC section, the operator first turns off the circuit breaker 26 using the unit on/off handle 42 on the front of the MCC unit 20. FIG. 4 is a top view of an example embodiment of the invention, with the top plate being removed for clarity, illustrating the advance/retract handle 90 and advance/retract mechanism 92 for connecting or disconnecting the stabs 30 with the power bus 24. Next, the advance/retract mechanism 92 can be actuated to separate the stabs 30 of the MCC unit from the power bus 24 of the MCC section. The advance/retract handle 90 for the advance/retract mechanism 92 (shown in FIG. 4) causes the advance/retract mechanism 92 to pull the pivoted platform 10 to separate the stabs 30 from the power bus 24. Operating the advance/retract handle 90 for the advance/retract mechanism 92 forces the platform 10 to pivot in the forward direction and disconnect the stabs 30 from the bus 24. When the stabs 30 on the forwardly pivoted platform 10 are disconnected from the power bus 24, the bail 80 and pin 82 mounted on the forwardly pivoting platform 10, are disconnected from the unit on/off handle 42 on the front wall 44 of the MCC unit 20.

When the pivoting platform 10 moves in the forward direction to disconnect the stabs 30 from the bus 24, the cam 70 rotates counter-clockwise with respect to the platform 10 to disengage from the pin 82, as shown in FIG. 1C. The cam surface 75 in the slot 74 of the cam 70 is configured to disengage the pin 82 of the bail 80 in a second position when the pivoted platform 10 is forced forward to disconnect the stabs 30 from the bus 24, thereby operatively disconnecting the unit on/off handle 42 on the front side of the MCC unit 20 from the switch handle 62 of the circuit breaker 26.

In this manner, the unit on/off handle 42 on the front wall 44 of the MCC unit 20 is disconnected from the switch handle 62 of the circuit breaker 26, so that the operator may no longer make use of the unit on/off handle 42 to turn on or off the circuit breaker 26. The MCC unit may then be safely removed from the section without exposing the operator to hazard.

FIGS. 1C and 2 show the operation of the unit interlock 47 that is actuated by the advance/retract mechanism 92, shown in FIG. 4. The unit interlock 47 prevents inserting or removing MCC units 20 from the MCC section, without first actuating the advance/retract handle 90 of an advance/retract mechanism 92 to retract the stabs 30 of the unit, to prevent contact with the power bus 24. The unit interlock 47 is an extension of the upper arm 43 that is connected by the upper arm pivot 78 to the pivoting platform 10. The unit interlock 47 is driven vertically upward by the inter-arm cam follower 45 and cam follower slot 77, to engage the external MCC section structure housing the MCC unit 20, when the pivoted platform 10 is forced in the backward direction to connect the stabs 30 to the bus 24, as shown in FIGS. 2 and 3. In this manner inserting or removing MCC units from the MCC section is prevented, without first actuating the advance/retract handle 90 for the advance/retract mechanism 92 to retract the stabs 30 to prevent contact with the power bus 24.

Another interlock feature for the unit interlock 47 is shown in the side view of FIG. 1C, where the unit on/off handle 42 is shown in the off-position 46. The upper arm 43 and the actuating arm 40 are connected by the inter-arm cam follower 45 that rides in the cam follower slot 77 (shown in FIG. 3) of the actuating arm 40. The cam follower slot 77 has an elongated S-shape. The S-shaped cam follower slot 77 and cam follower 45 will drive the unit interlock 47 upward to prevent insertion of the unit 20 into the MCC section when the unit on/off handle 42 is in the on-position 50 of FIG. 3.

Another interlock feature prevents inadvertently leaving the circuit breaker 26 ON when the stabs 30 are retracted from the bus 24. In operation, the unit interlock 47 is raised up by the cam follower slot 77 when the unit on/off handle is up, in the ON position 50 of FIG. 3. The handle interlock 19 that is part of the advance/retract mechanism 92 shown in FIG. 4, will be blocked from moving, by the vertically raised position of the unit interlock 47, if an attempt were made to retract the stabs 30 from the bus 24. Only if the unit on/off handle 42 is moved down, into the off position 46 of FIG. 1C, will the unit interlock 47 be vertically lowered by the cam follower slot 77, thereby freeing the movement of the handle interlock 19. When the unit on/off handle 42 is moved down, into the off position 46, the circuit breaker 26 is in the OFF state. The advance/retract mechanism 92 may then retract the stabs 30 from the bus 24.

When the advance/retract mechanism 92 retracts the stabs 30 from the bus 24, the cam 70 disengages from the pin and bail 80 so that the circuit breaker 26 will remain in the OFF state. Since the unit on/off handle 42 has been disengaged from the circuit breaker 26 after it has been turned OFF, the circuit breaker must remain in the OFF state. The next time that the stabs 30 are advanced into contact with the bus 24, the circuit breaker 26 will be in the OFF state. The circuit breaker 26 cannot be turned on by the unit on/off handle 42 until after the stabs 30 have been advanced into contact with the bus 24 so that the cam 70 becomes engaged with the pin and bail 80.

Although specific example embodiments of the invention have been disclosed, persons of skill in the art will appreciate that changes may be made to the details described for the specific example embodiments, without departing from the spirit and the scope of the invention.

What is claimed is:

1. A connect/disconnect mechanism for a motor control center unit, comprising:
   a cam rotatably mounted on a cam shaft mounted on a pivoted platform in a motor control center unit, having a cam surface in a slot opening on a periphery of the cam, the pivoted platform supporting a circuit breaker and stabs electrically connected to the breaker that are configured to connect to a power bus when the pivoted platform is forced backward;
   an actuating arm coupled between a unit on/off handle located on a front side of the motor control center unit and the cam, the actuating arm configured to rotate the cam in response to actuation of the unit on/off handle, and to cause the cam to rotate as the cam shaft follows a pivoting motion of the pivoted platform relative to a position of the actuating arm;
   a bail pivotally mounted on the pivoting platform and connected to a switch handle of the circuit breaker, the bail having a pin projecting therefrom, the cam surface in the slot of the cam being configured to engage the pin of the bail in a first position when the pivoted platform is forced backward to connect the stabs to the power bus, thereby operatively connecting the unit on/off handle to the switch handle of the circuit breaker; and
   the cam surface in the slot of the cam being further configured to disengage the pin of the bail in a second position when the pivoted platform is forced forward to disconnect the stabs from the bus, thereby operatively disconnecting the unit on/off handle from the switch handle of the circuit breaker.

2. The connect/disconnect mechanism for a motor control center unit of claim 1, further comprising:
   a handle interlock coupled to the unit on/off handle, configured to block movement of an advance/retract mechanism coupled to the stabs, when the unit on/off handle is moved into an on position, to thereby prevent disconnecting the stabs from the power bus until the unit on/off handle is moved to an off position;
   the cam surface in the slot of the cam being configured to move the bail and the switch handle of the circuit breaker to turn off the circuit breaker when the unit on/off handle is moved to the off position while the stabs are connected to the power bus; and
   the cam surface in the slot of the cam being configured to disengage the pin of the bail when the stabs are disconnected from the power bus by the advance/retract mechanism, thereby operatively disconnecting the unit on/off handle from the switch handle of the circuit breaker that has been turned off.

3. The connect/disconnect mechanism for a motor control center unit of claim 1, further comprising:
   a unit interlock coupled to the pivoting platform, configured to block removal of the motor control center unit from a motor control center, when the pivoted platform is forced backward to connect the stabs to the bus.

4. A motor control center unit, comprising:
   a housing configured to be inserted into a motor control center, the housing including an outer structure comprising side walls, a bottom plate, a back wall, and a front door hinged to one of the side walls and configured to open a front side of the housing to provide access to an interior space, an exterior face of the back wall of the housing being configured to be located adjacent to an electrical power bus when the housing has been inserted into the motor control center;
   a pivoted platform mounted on a pivot fastened to an interior face of the back wall of the housing, the platform supporting a circuit breaker on a front side of the platform and supporting stabs on a back side of the platform, the stabs being electrically connected to a circuit breaker electrical switch actuated by a circuit breaker switch handle of the circuit breaker, the stabs configured to project through an opening in the back wall of the housing, to mechanically and electrically engage the power bus for electrical connection therewith, when the platform is pushed in a backward direction on the pivot against the back wall;

an advance/retract handle accessible on the front side of the housing, connected to an advance/retract mechanism configured to push the pivoted platform to connect the stabs to the power bus or pull the pivoted platform to disconnect the stabs from the power bus;

a connect/disconnect mechanism located within the housing, comprising a cam, an actuating arm, and a bail with a pin:

the cam of the connect/disconnect mechanism, being rotatably mounted on a cam shaft mounted on the pivoted platform in the housing, having a cam surface in a slot opening on a periphery of the cam;

the actuating arm of the connect/disconnect mechanism, being coupled between a unit on/off handle located on the front side of the housing and the cam, the actuating arm configured to rotate the cam in response to actuation of the unit on/off handle, and to cause the cam to rotate as the cam shaft follows a pivoting motion of the pivoted platform relative to a position of the actuating arm; and the bail of the connect/disconnect mechanism, being pivotally mounted on the pivoting platform and connected to the switch handle of the circuit breaker, the bail having the pin projecting therefrom, the cam surface in the slot of the cam being configured to engage the pin of the bail in a first position when the pivoted platform is forced backward by the advance/retract mechanism, to connect the stabs to the power bus, thereby operatively connecting the unit on/off handle to the switch handle of the circuit breaker; and the cam surface in the slot of the cam being further configured to disengage the pin of the bail in a second position when the pivoted platform is forced forward to disconnect the stabs from the bus, thereby operatively disconnecting the unit on/off handle from the switch handle of the circuit breaker.

5. The motor control center unit of claim 4, further comprising:

a handle interlock coupled to the unit on/off handle, configured to block movement of the advance/retract mechanism coupled to the stabs, when the unit on/off handle is moved into an on position, to thereby prevent disconnecting the stabs from the power bus until the unit on/off handle is moved to an off position;

the cam surface in the slot of the cam being configured to move the bail and the switch handle of the circuit breaker to turn off the circuit breaker when the unit on/off handle is moved to the off position while the stabs are connected to the power bus; and the cam surface in the slot of the cam being configured to disengage the pin projecting from the bail when the stabs are disconnected from the power bus by the advance/retract mechanism, thereby operatively disconnecting the unit on/off handle from the switch handle of the circuit breaker that has been turned off.

6. The motor control center unit of claim 4, further comprising:

a unit interlock coupled to the pivoting platform, configured to block removal of the housing from the motor control center, when the pivoted platform is forced backward by the advance/retract mechanism, to connect the stabs to the bus.

\* \* \* \* \*